Sept. 8, 1964       R. A. McCULLOUGH       3,147,892
AERATION UNLOADING ATTACHMENT FOR FINE SOLIDS
Filed Oct. 26, 1961
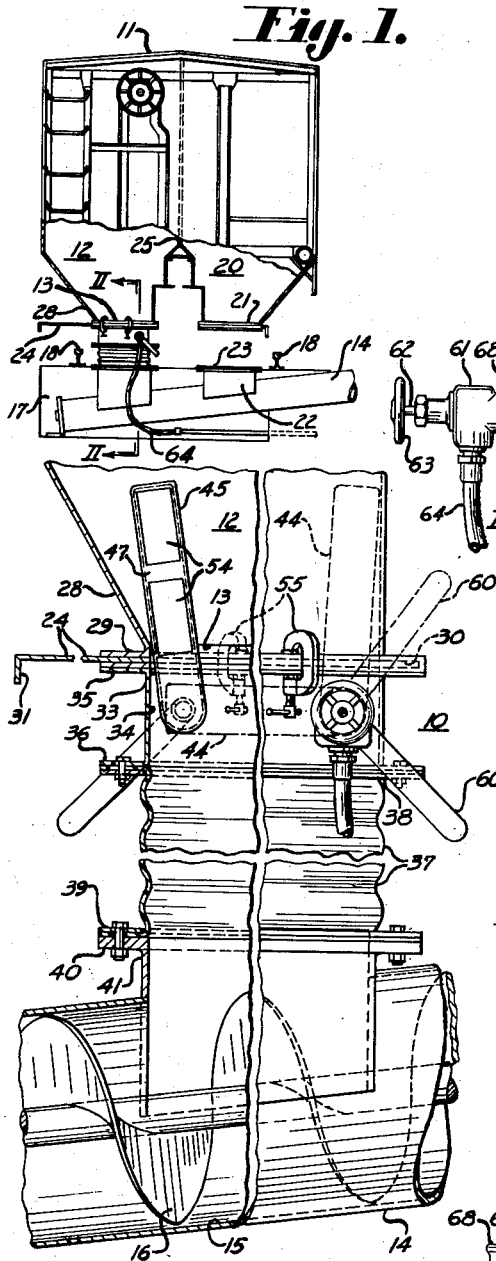
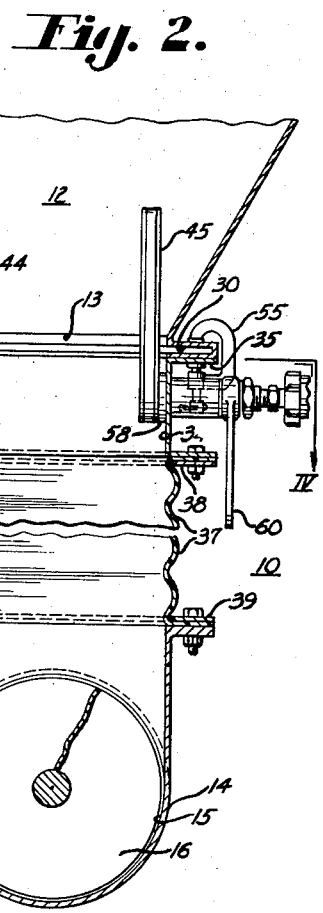
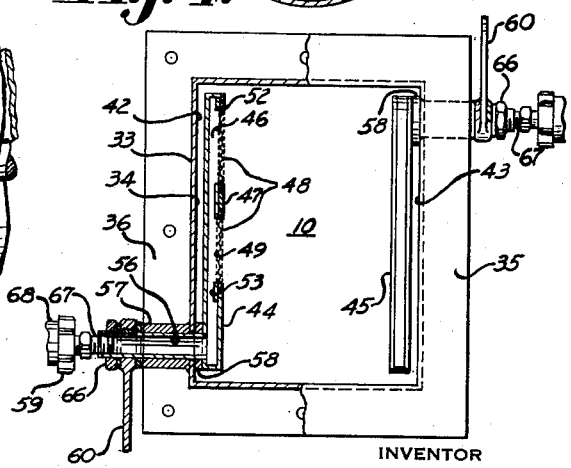
INVENTOR
RAY A. McCULLOUGH
*Hooper, Leonard & Buell*
his attorneys

United States Patent Office 3,147,892
Patented Sept. 8, 1964

3,147,892
AERATION UNLOADING ATTACHMENT FOR FINE SOLIDS
Ray A. McCullough, Oakmont, Pa., assignor to Blaw-Knox Company, Pittsburgh, Pa., a corporation of Delaware
Filed Oct. 26, 1961, Ser. No. 147,905
6 Claims. (Cl. 222—195)

This invention relates to aeration flow promotion aeration unloading attachment means for fine solids, e.g., pulverized materials, to be discharged through an outlet usually of a diminished outlet area nature. More particularly, this invention relates to an unloading attachment device for vehicle or fixed hoppers or other bulk containers used for finely ground or pulverized materials, such as finely ground bulk cement, which have a tendency to arch or pack and thus block or impede flow by gravity through a relatively constricted discharge outlet in or around the bottom of such hopper or bulk container.

The unloading of bulk containers for fine solids such as pulverized cement and other materials presents many problems when, as in the usual case, the discharge of such solids is to be made through an outlet having an opening of reduced area when the outlet is opened by the removal of a gate or other closure used therewith. In the case of hopper-type cars handling finely ground bulk Portland cement, for example, starting the flow of cement on numerous occasions has required the use of hand spades, or hand-operated air pressure lances inserted in the cement from the top of the car. At that, it has often been difficult or virtually impossible under some conditions to reach the troublesome area, which commonly is at or adjacent the narrow discharge openings at the bottom of such hoppers.

The foregoing difficulties are overcome by the present invention. Therein, an unloading device is provided which can readily be coupled to and uncoupled from the discharge outlet of a hopper, or other bulk container, to provide in that zone aeration flow promotion means within a completely enclosable passage to start and/or conduct the flow of such fine solids to the next handling device or piece of equipment to receive the discharged solids. Moreover, the device of this invention preferably provides positionable means for the aeration elements and a flexible conduit portion for the accommodation of different distances between such a bulk container discharge outlet and the receiver for the fine solids which may be in the form of a conveyor, elevator, vehicle vessel or other equipment.

Other objects, features and advantages of this invention will be apparent from the following description and the accompanying drawings, which are illustrative of one embodiment only, in which FIGURE 1 is an end view of a hopper-type railroad car, such as might be used for transporting bulk cement in finely ground condition, utilizing one embodiment of an unloader device of this invention in the act of discharging one hopper into an undertrack conveyor;

FIGURE 2 is a view in section, somewhat enlarged, taken along line II—II of FIGURE 1 showing an unloading attachment embodiment of this invention in connected operative position;

FIGURE 3 is an end view, somewhat enlarged, of the left side of the device as shown in FIGURE 1; and FIGURE 4 is a plan view, partly in section, taken along the line IV—IV of FIGURE 2, except that aeration elements have been moved into a position wholly within the unloading attachment embodiment shown in the drawings.

Referring to the drawings, an unloader device 10 is shown connected to a cement hopper car for discharge from one hopper 12 thereof through its constricted discharge opening 13 into an undertrack conveyor 14 through which the pulverized cement is conveyed inside of a trough casing 15 by a feed screw 16 to an elevator or to a batch mixer or to a storage bin or other item of equipment, as may be desired. The lower end of the undertrack conveyor 14 is positioned in a pit 17 beneath the tracks 18 on which the braked wheels of car 11 stand during the unloading of hopper 12. Hopper 12 is in side-by-side relation to a hopper 20 which usually would be simultaneously discharged through a discharge outlet 21, using another unloading device of this invention like device 10, into a conveyor inlet 22 when cover 23 is removed therefrom.

The hoppers 12 and 20 are provided with transverse separating partitions extending across the car to a vertical longitudinally extending partition 25 and normally filled through openings on the top of the car, which are covered after such filling. After hopper 12 has been discharged, unloader 10 is uncoupled from the discharge outlet 13 and a slide gate 24 for that hopper is either left open or reclosed and the other hoppers are moved above conveyor 14 for discharge. When car 11 is emptied wholly, or to the extent desired, the unloading device of this invention is uncoupled therefrom and car 11 is moved on to place the conveyor 14 and device 10 in readiness for a further unloading operation.

Discharge outlet 13 is a constricted opening in the bottom of the inverted pyramidal portion 28 of hopper 12 and is surrounded around its bottom edge by a channel flange 29 having opposed transverse grooves 30 in which gate 24 slides when a bent grip 31 at the outer end of the gate is pulled or pushed as the case may be. In unloading a hopper, gate 24 is preferably pulled out fully so that no part thereof is in the way to block discharge outlet 13. When material from a hopper had been discharged to the extent desired, and after aeration parts of unloader 10 are swung out of the way into the generally horizontal dotted position in FIGURE 3 within unloader 10, the gate 24 is closed and then C-clamps are detached so that unloader device 10 can be disengaged from hopper 12 to make device 10 ready for reconnection to another discharge outlet from which fine solids are to be emptied.

Unloader attachment 10 comprises a collar 33 of sheet metal having a rectangular vertical opening 34 therethrough, a rigid upper flange 35 and a rigid lower flange 36. Upper flange 35 is adapted to be detachably secured in sealed relation to flange 29 by C-clamps 55. A flexible conduit 37 is provided made of a material such as "neoprene," rubberized canvas, or other suitable material, either round or rectangular in plan, and joined at its upper edge to a rigid rectangular flange 38 which may be permanently or detachably fastened to flange 36. A gasket may be used therebetween, or the facing surfaces of the flanges may be ground, if desired, to avoid leakage inwardly or outwardly between such flanges. The lower edge of flexible conduit 37 is similarly fastened to a rigid rectangular flange 39 which is adapted to be detachably secured in sealed relation to a rigid flange 40 at the top of a rectangular sheet metal box inlet 41, the interior of which communicates with the interior of the wholly enclosed undertrack conveyor 14. Flexible conduit 37 is provided with extra material between its flanges 38 and 39 by means of transverse pleating, e.g., a bellows construction, so that it is extensible and retractable to provide a flexible distance between flanges 35 and 39 so that unloader 10 may be selectively varied in length to fit the distance between a discharge outlet such as outlet 13 and a receiving inlet such as inlet 41, or some other distance such as the distance between discharge outlet 21 and inlet 22.

In the illustrated embodiment of unloader attachment 10, the front and back walls 42 and 43 thereof respectively are closely adjacent to respective front and back aeration arms 44 and 45. Each such arm has a hollow interior 46 which acts as a plenum chamber and a face 47 toward the inside of the opposite wall of collar 33, which face 47 is substantially covered by porous surfaces 48. Porous surfaces 48 may comprise a plurality of layers 49 such as a layer of wire mesh, a layer of woven fabric such as cotton or fiber-glass and another layer of wire mesh to sandwich the fabric therebetween. A retainer ring 52 may be used to engage the edge of a porous surface and bind it to an internal lip 53 surrounding each of the aeration openings 54 in face 47.

Each of the arms 44 and 45 is respectively fixed to a hollow pivot shaft 56 which communicates with the plenum chamber 46 therein. The shaft 56 is journalled in a bushing 57 fixed to collar 33 and a gasket 58 seals the space around the outside of the shaft. The outer end of shaft 56 is externally threaded to receive a nut 66 and to hold a handle 60 in keyed relation to shaft 56 between nut 66 and the outer end of bushing 57, spacing washers being used immediately to each side of handle 60. The internal thread of the outer end of shaft 56 is connected to a nipple 67 which in turn is connected to a conventional ball swivel joint within a housing 68 closed by a cap nut 59. Thus, as handle 60 is rotated it will move its respective arm 44 or 45, as the case may be, through a corresponding arc by the rotation of its shaft 56, without rotating swivel joint housing 68. A handle 60 will swing its respective arm manually through an arc to any selected position between a position shown by the horizontal chain lines in FIGURE 3 which is wholly within collar 33, and by the solid lines in FIGURE 4, and a position shown in full lines in FIGURES 2 and 3 in which the arms project upwardly into the bottom portion of hopper 12 or other discharge outlet to which device 10 may be connected at the time being. When said arms 44 and 45 are swung upward, they will remain in position during the discharge of pulverized materials, the flow of which is promoted by the aeration provided by said arms. In the illustrated embodiment, the respective arms 44 and 45 are mounted on opposite sides of the collar and at opposite ends in generally opposed right-hand and left-hand relation, with the porous surfaces 48 of each facing the center of the opening through collar 33 and the conduit 37. Housing 68 of each of the swivel joints is assembled with a valve 61 through which air is supplied to its respective arm by a flexible pipe 64. A valve handle 63 and stem 62 in each valve 61 can be adjusted to regulate the pressure and/or quantity of air admitted to each of the arms 44 and 45, respectively. In this specification, the term "air" is meant to include any other gas which may be used for such purpose and the "aeration" effected thereby hereunder.

In the operation of the illustrated embodiment, after a vehicle such as car 11 is positioned over conveyor 14, device 10 with the aeration arms thereof within collar 33, is connected to flanges 29 and 40. Thereupon slide gate 24 is opened, air is admitted through the valves 61 to the respective arms 44 and 45 and the handles 60 are manipulated to swing the arms 44 and 45 about the axes of their respective pivot shafts 56 upwardly toward or into the material to be discharged. The aeration provided by such arms through the porous surfaces 48 will start and/or increase the flow of the fine solids to be discharged and keep them flowing until the emptying operation has been carried as far as desired. Following such emptying, the arms 44 and 45 are returned to their position within collar 33 and slide gate 24 reclosed as desired or required, following which, unloader 10 is disconnected from flange 29 and thus made ready for a further discharge operation; or unloader 10 is also disconnected from flange 40 and the cover replaced on box 41 so that the unloader 10 is wholly free to be moved wherever it is next to be used.

Various changes may be made in the illustrated embodiment of this invention and other embodiments provided, and the embodiments may be utilized in various positions, without departing from this invention or the scope of the appended claims.

I claim:

1. An aeration unloading attachment for fine solids comprising, in combination, a collar adapted to be attached to a discharge outlet for fine solids in a container to comprise a continuation thereof below said outlet, said collar having a wall defining an opening therethrough, a hollow arm, a hollow pivotal connection extending through said opening in said wall to engage said arm, handling means outside said wall to swing said arm about said pivotal connection from a position of said arm substantially wholly within said collar to a non-flow-obstructing position projecting upwardly beyond said collar a substantial distance within said outlet, means for supplying air to the interior of said arm through said pivotal connection from the outside of said collar, and porous means on said arm, whereby unloading of fine solids from containers having a discharge outlet are facilitated when air is supplied to said arm to aerate said fine solids through said porous means at one or more selected locations within the path of movement of said arm.

2. An aeration unloading attachment as set forth in claim 1, comprising, further, a further such hollow arm, said arms being positioned on opposite sides of said collar to provide a pair of substantially opposed hollow arms, a further such hollow pivotal connection extending through said wall to engage said further such hollow arm, said pivotal connections extending through opposite sides of said wall of said collar respectively, said pivotal connections having substantially parallel axes lying within a substantially horizontal plane, said porous means on said hollow arms respectively facing away from the adjacent wall and toward the middle of said opening, whereby movement of said arms about said respective pivotal connections occur in opposite directions when viewed axially from any one position in space relative to the axes of said pivotal connections.

3. An aeration unloading attachment for fine solids comprising, in combination, a rigid rectangular flanged collar having a conduit opening therethrough and adapted to be connected to and generally below a discharge outlet of a container for fine solids, a pair of hollow arms pivotally connected to said collar on opposite sides thereof, a hollow pivot shaft rigidly connected to each arm and extending through the adjacent side of said collar respectively, each shaft having a passage communicating with the interior of its respective arm, means connected to each of said shafts outside said collar selectively to swing its respective arm about the axis of its shaft between a position substantially within said collar and a non-flow-obstructing position extending upwardly beyond said collar a substantial distance within said outlet, each of said shafts having a passage therethrough in communication with the interior of its respective arm, each said arm having a porous surface for the discharge of air from the interior of said arm to promote flow of said fine solids, and flexible conduit means connected to said collar for selectively varying the height of said unloading attachment.

4. An aeration unloading attachment as set forth in claim 3 in which each of said shafts outside of said collar is connected to a valve and swivel joint coupling having a stationary portion adapted to receive air for passage through said shaft and into its respective arm for aeration discharge through said porous surface.

5. An aeration unloading attachment as set forth in claim 4 in which said porous surface comprises a fabric sandwiched between wire mesh set substantially flush in an aeration opening in each arm so as not to project beyond the adjacent surface portions of said arm to facilitate swinging of each said arm respectively to a selected position or positions in the course of an unloading operation.

6. An aeration unloading attachment for fine solids comprising, in combination, a conduit having means at the upper and lower ends thereof adapted to be connected to and generally below a discharge outlet of a container of fine solids to direct said fine solids into a receiver therefor, said conduit being extensible and retractable in length at least in part between its respective ends, a movable member inside said conduit operable from the outside thereof between a selected position substantially wholly within said conduit and a selected position projecting beyond said conduit an operatively effective distance into said outlet, said member having a porous surface to discharge air therethrough to promote flow of said fine solids, and means for supplying air to said member from the outside of said conduit to be discharged through said porous surface, whereby said member may be selectively positioned when said conduit is connected for an unloading operation as may be most conducive to the promotion of flow of said fine solids.

References Cited in the file of this patent

UNITED STATES PATENTS

| | | |
|---|---|---|
| 1,210,403 | Blake | Jan. 2, 1917 |
| 1,825,431 | Tsagaris | Sept. 29, 1931 |
| 1,849,950 | Murdock | Mar. 15, 1932 |
| 2,609,125 | Schemm | Sept. 2, 1952 |

FOREIGN PATENTS

| | | |
|---|---|---|
| 215,932 | Australia | July 15, 1958 |